(12) United States Patent
Dennis

(10) Patent No.: US 11,197,418 B2
(45) Date of Patent: Dec. 14, 2021

(54) FAN-EQUIPPED DUAL-PURPOSE GRAIN CART FOR TRANSPORTING AND DRYING GRAIN

(71) Applicant: Ryan J. Dennis, Holdfast (CA)

(72) Inventor: Ryan J. Dennis, Holdfast (CA)

( * ) Notice: Subject to any disclaimer, the term of this patent is extended or adjusted under 35 U.S.C. 154(b) by 0 days.

(21) Appl. No.: 16/925,981

(22) Filed: Jul. 10, 2020

(65) Prior Publication Data
US 2021/0251141 A1 Aug. 19, 2021

(30) Foreign Application Priority Data

Feb. 18, 2020 (CA) ........................... 3072823

(51) Int. Cl.
| | |
|---|---|
| *B60P 1/42* | (2006.01) |
| *A01D 41/133* | (2006.01) |
| *A01D 82/00* | (2006.01) |
| *A01D 90/10* | (2006.01) |
| *B62B 1/04* | (2006.01) |

(52) U.S. Cl.
CPC ........... *A01D 41/133* (2013.01); *A01D 82/00* (2013.01); *A01D 90/10* (2013.01); *B60P 1/42* (2013.01); *B62B 1/042* (2013.01); *B62B 2204/00* (2013.01)

(58) Field of Classification Search
CPC ....... B60P 1/42; B62B 1/042; B62B 2204/00; A01D 41/133; A01D 82/00; A01D 90/10
See application file for complete search history.

(56) References Cited

U.S. PATENT DOCUMENTS

| 5,551,167 A | * | 9/1996 | van Fossen | ............. | F26B 17/14 |
| | | | | | 34/168 |
| 10,743,474 B1 | * | 8/2020 | Schlimgen | ........... | B65G 41/008 |

OTHER PUBLICATIONS

Mommymilestones, "Grain Dryers for our grain hopper", Youtube, https://www.youtube.com/watch?v=f_DxCYRJBh4, Mar. 11, 2015 (Mar. 11, 2015).

\* cited by examiner

*Primary Examiner* — Saul Rodriguez
*Assistant Examiner* — Willie Berry, Jr.
(74) *Attorney, Agent, or Firm* — Kyle R Satterthwaite; Ryan W Dupuis; Ade & Company Inc.

(57) ABSTRACT

A dual-purpose agricultural cart for transporting and conditioning grain or other particulate material. The cart features a transportable frame, a holding container for receiving and holding the particulate material, a fan, and one or more airflow channels each having an inlet fed by the fan and at least one outlet positioned to open into the holding container at an elevation at or proximate a lower end of the holding container. The particulate material is aerated via upward fan-driven airflow from the outlet(s) of the one or more airflow channels. The same cart used to transport grain between a combine harvester and road transport vehicle during harvest can be used after harvest, or during harvest delays, the dry harvested grain before long term storage or long-distance transport.

25 Claims, 5 Drawing Sheets

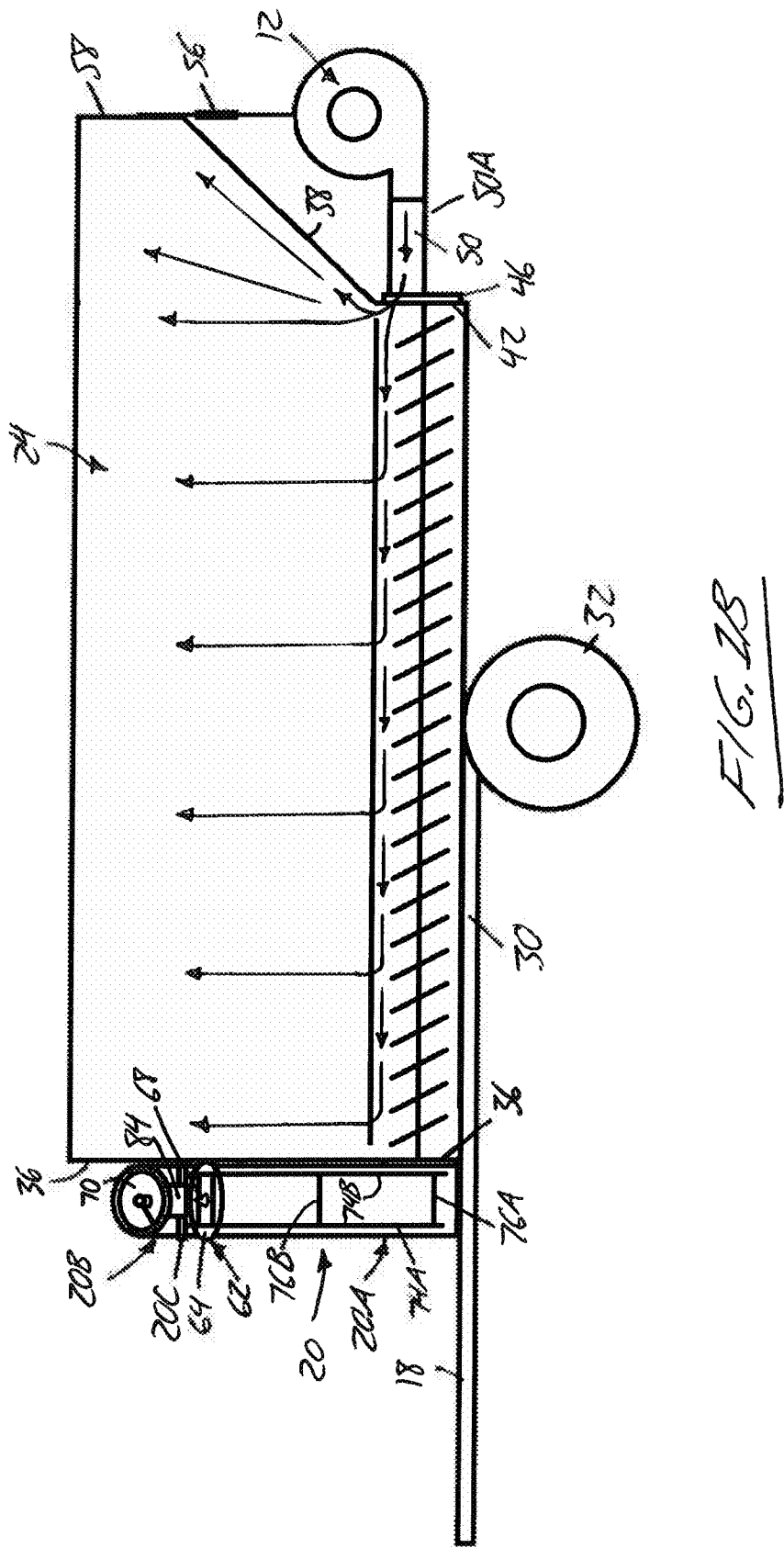

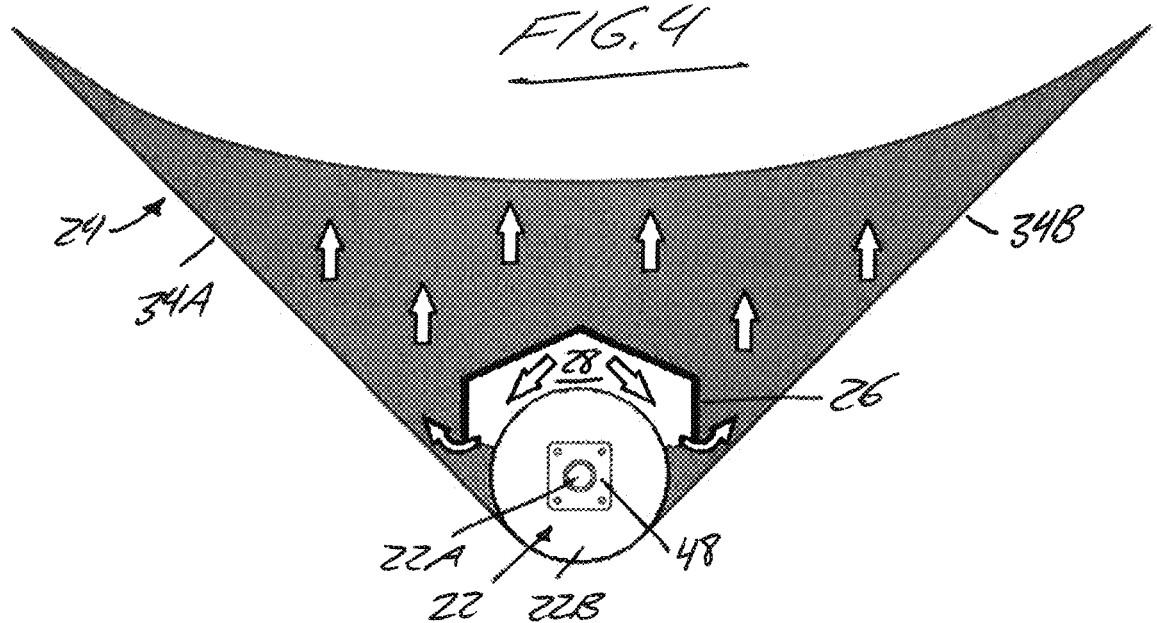
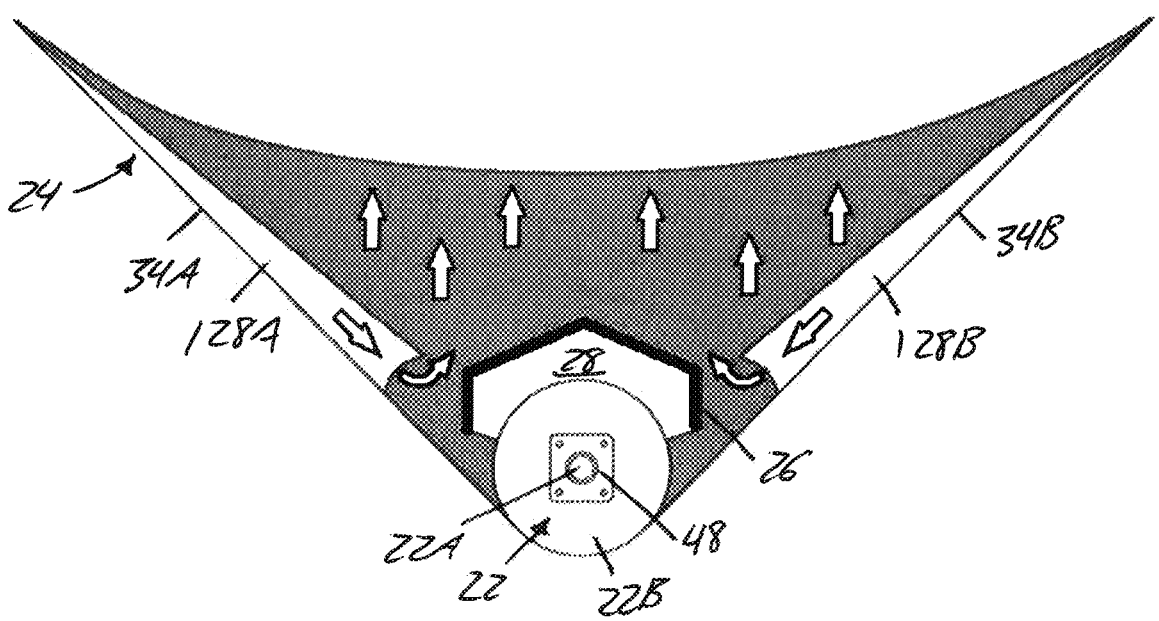

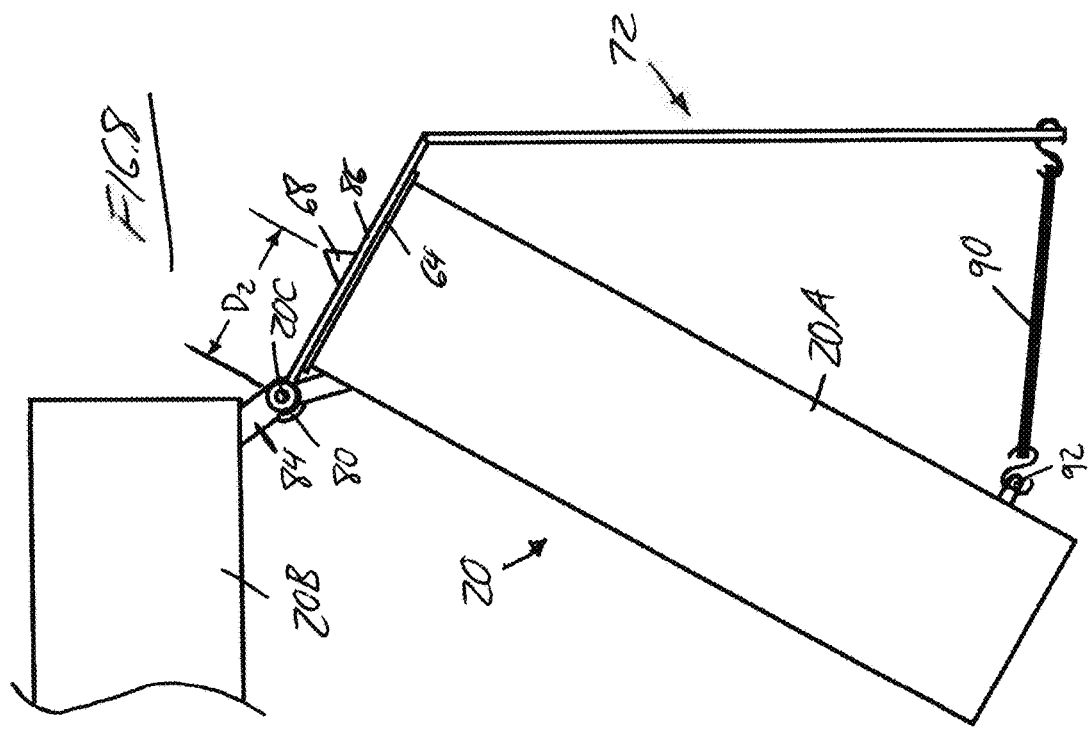
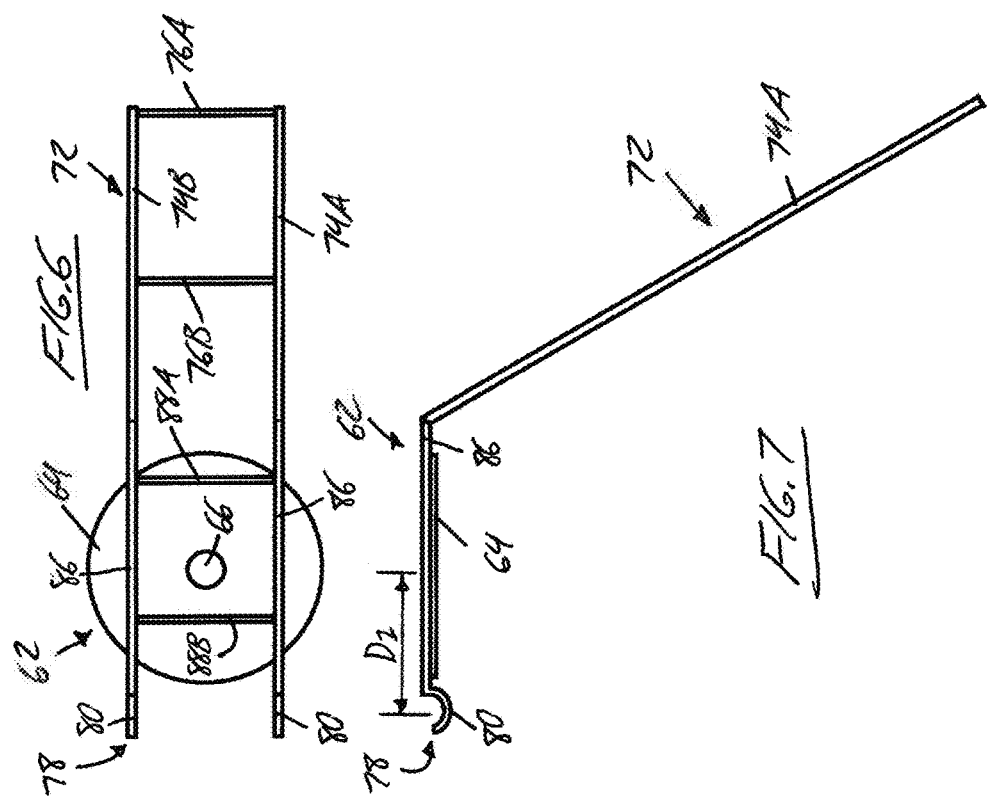

FAN-EQUIPPED DUAL-PURPOSE GRAIN CART FOR TRANSPORTING AND DRYING GRAIN

CROSS-REFERENCE TO RELATED APPLICATIONS

This application claims foreign priority benefit under 35 U.S.C. 119(a) of Canadian Patent Application No. 3,072,823, filed Feb. 27, 2020, the entirety of which is incorporated herein by reference.

FIELD OF THE INVENTION

The present invention relates generally to agricultural equipment, and more particularly to agricultural carts used to transport grain or other particulate material.

BACKGROUND

In the agricultural industry, it is well known that storage of grain at excessive moisture levels can lead to spoilage, and so depending on the moisture content of the grain at the time of harvest, it may be necessary to dry the grain in advance of any further long-term storage or long-distance transport. The process of harvesting and then subsequently drying the grain is typically a multi-step process involving use of multiple types of discrete machinery, and involving several stages of grain transfer between and within the different pieces of equipment. During harvest, a combine harvester is used in the field to reap, thresh and winnow the grain crop, during which a tractor-towed grain cart is commonly employed to transport the grain from the combine harvester operating in the field to a roadway transport vehicle. The roadway transport vehicle is typically a semi-trailer truck with one or more hopper bottom trailers, parked nearby on a field-adjacent roadway for the purpose of transporting the grain to a remote storage site. At the storage site, the grain is typically unloaded from the road transport vehicle to one or more grain storage bins using an auger.

Should the grain require drying due to significant moisture content, the wet grain is unloaded from the storage bins and fed into a separate grain dryer, through which the grain is conveyed, and then subsequently unloaded from the grain dryer into another storage bin, or into a roadway transport vehicle (e.g. semi-trailer truck) for transport to a grain elevator. The farmer incurs a notable capital expense to purchase and setup the dryer, on top of the other necessary equipment essential for the harvest and storage operations (combine, grain cart, storage bins, auger, etc.). Meanwhile, depending on crop conditions at the time of harvest, drying may not be necessary some years, meaning that the costly dryer sits unused.

Accordingly, there remains a need for improved and alternative solutions for drying harvested grain.

SUMMARY OF THE INVENTION

According to one aspect of the invention, there is provided a dual-purpose agricultural cart for transporting and conditioning particulate material, said cart comprising:
 a frame supported in elevated relation over an underlying ground surface in a manner conveyable therealong;
 a holding container carried on said frame for receiving and holding said particulate material;
 a fan carried on the frame; and
 one or more airflow channels each comprising an inlet fed by the fan and at least one outlet positioned to open into the holding container at an elevation at or proximate a lower end thereof to enable aeration of the particulate material via upward fan-driven airflow from the at least one outlet of the one or more airflow channels.

According to another aspect of the invention, there is provided a method of using the aforementioned agricultural cart to aerate a volume of particulate material, said method comprising, with said volume of particulate material held in the container, running the fan and thereby forcing airflow through the one or more airflow channels and into the volume of particulate material to generate upward airflow through the volume of particulate material from the at least one outlet of the one or more airflow channels.

BRIEF DESCRIPTION OF THE DRAWINGS

Preferred embodiments of the invention will now be described in conjunction with the accompanying drawings in which:

FIG. 1B is another schematic side elevational view of the dual-purpose grain cart of FIG. 1A, but in a grain drying mode of operation.

FIG. 4 is a schematic illustration showing airflow inside a holding container of the grain cart of FIG. 1B as viewed from a rear end thereof, and showing distribution of air via a central longitudinal channel near the bottom of the holding container.

FIG. 5 is a schematic illustration showing airflow inside the grain cart in the grain drying mode of an alternate embodiment, in which the forced air is instead fed into lateral airflow channels built into side walls of the grain cart's holding container.

FIG. 6 is a top plan view of a discharge cover for blocking airflow through a discharger auger of the grain cart in the grain drying mode of operation.

FIG. 7 is a side elevational view of the discharge cover of FIG. 6.

FIG. 8 illustrates an installed position of the discharge cover of FIGS. 6 and 7 on a folded discharge auger of the grain cart of FIG. 1B, but viewed from the front end of the grain cart.

DETAILED DESCRIPTION

Figure 1A:
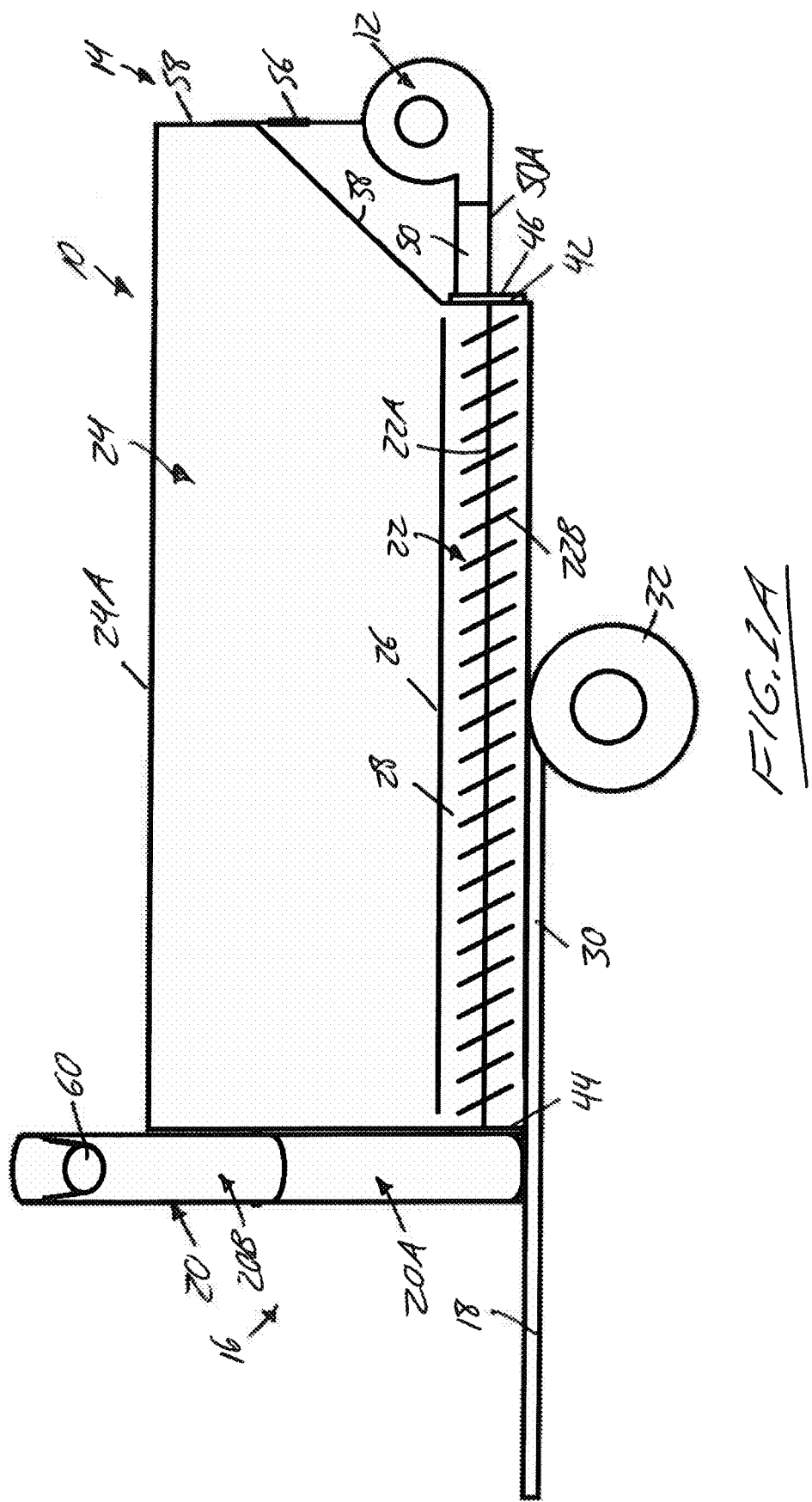
FIG. 1A is a schematic side elevational view of a dual-purpose grain cart of the present invention, shown in a field harvesting mode of operation.
Figure 2:
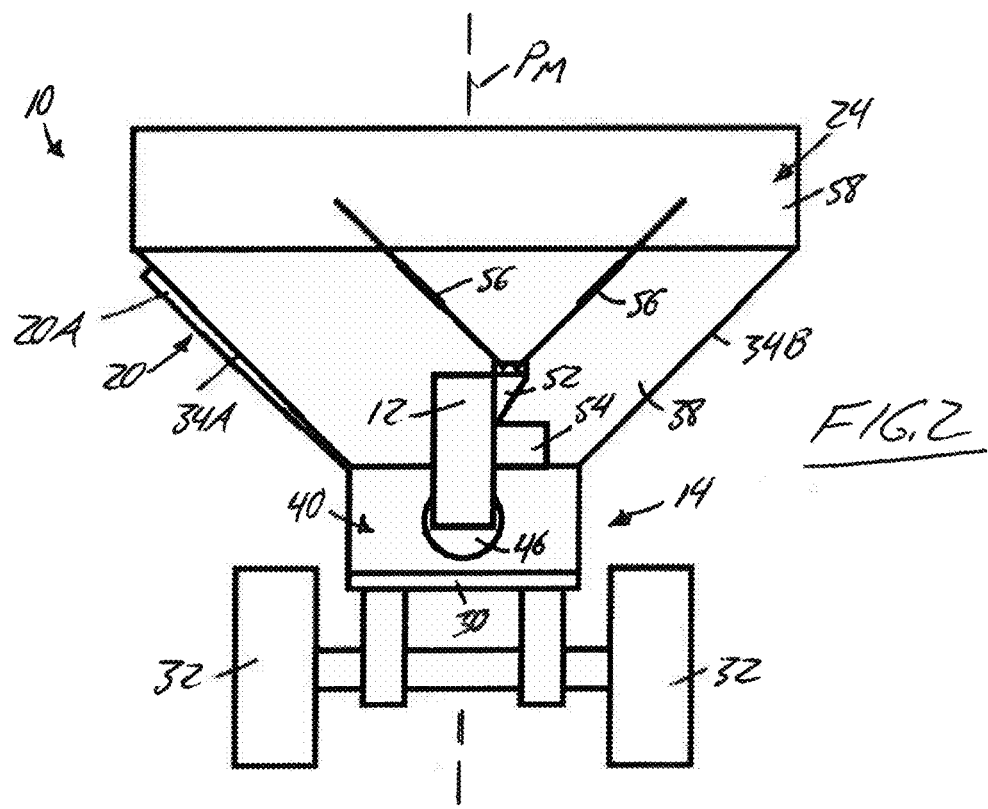
FIG. 2 is rear elevational view of the dual-purpose grain cart of FIG. 1B.

FIGS. 1A, 1B and 2 illustrate a dual-purpose grain cart 10 according to one embodiment of the present invention, in which a conventional single-purpose grain cart intended solely for grain transport purposes has been modified to add a fan 12 thereto in a manner enabling use of the same grain cart for the secondary purpose of drying grain, thus allowing farmers to use an existing piece of equipment for grain drying purposes rather than having to invest in a separate grain dryer. In this first embodiment, the fan is installed at a rear end 14 of the grain cart that resides oppositely of a front end 16 at which the grain cart features a pull tongue 18 and discharge auger 20 for towed conveyance of the grain cart 10 by a tractor, and unloading of the cart's grain contents into the cargo hold of a road transport vehicle, typically a hopper bottom trailer of a semi-trailer truck.

The first embodiment makes use of an open cavity space that is maintained between a longitudinal auger 22 that runs centrally and longitudinally along the bottom of the grain cart's holding container 24, and a protective auger cover 26 that overlies the longitudinal auger 22 in slightly elevated relation thereover over a full or substantially full length thereof. The longitudinal direction refers to that in which the opposing front and rear ends 16, 14 of the grain cart is spaced, and in which the grain cart therefore travels when towed. As is know in the art, the auger cover 26 is included so that the weight of accumulated grain inside the holding container 24 isn't exerted directly on the longitudinal auger 22 itself. The cavity space maintained beneath the auger cover 26 and over the longitudinal auger 22 creates a longitudinal airflow channel 28 spanning a full or substantially full length of the cart's holding container 24 in the longitudinal direction, by which air from the fan 12 can thus be distributed into the interior space of the holding container 24 over the full length thereof via this airflow channel 28.

As described in more detail below, the fan is installed in a position feeding the air into this longitudinal airflow channel 28 in a forward direction from the rear end 14 of the cart toward the opposing front end 16 thereof. As described in more detail below, airflow through the discharge conveyor 20 at the front end of the grain cart is obstructed during the grain drying operation, and so the airflow induced into the longitudinal airflow channel 28 quickly fills up and pressurizes this channel and spills out from under the auger cover 26 and permeates upwardly through the grain contents of the holding container, eventually escaping the grain cart 10 through the open top end 24A of the holding container. A continuous upflow of air through the grain is thus generated and maintained over the full length of the holding container 24 during operation of the fan 12, whereby this aeration of the container's grain contents is effective to dry the grain and carry away the removed excess moisture via the open top of the holding container. Though not shown, the fan 12 may include or be connected to a heater, so that the forced air directed into the holding container is heated air that improves the drying action on the grain, and therefore reduces the drying time needed to accomplish either a targeted moisture content value or desired degree of moisture reduction. It will also be appreciated that though the illustrated embodiment schematically shows a centrifugal fan, it will be appreciated that any variety of fan may be used.

The holding container 24 is mounted atop a wheeled frame 30 of the grain cart, which is conveyable over agricultural land or any other underlying ground surface by way of a set of ground wheels 32 rotatably coupled to the frame 30, though it will be appreciated that a set of tracks may be used in place of ground wheels 32 to likewise support the frame in transportable fashion over the ground, as is well known in the art of grain carts. The holding container 24 is of a downwardly tapered hopper-type configuration, with two sloped side walls 34A, 34B running longitudinally of the cart in symmetric downwardly-converging relation to one another across a longitudinal midplane PM of the cart to gravitationally urge the received grain toward the midplane. The rear end of the holding container 24 also features a sloped rear wall 38 that slopes downwardly forward to gravitationally urge the received grain longitudinally forward. In the illustrated embodiment, the front end of holding container features a non-sloped front wall 36 that instead lies perpendicular to the longitudinal direction.

The longitudinal auger 22 resides in a channel-like bottom section 40 of the holding container 24 that is attached to the sloped rear and side walls 38, 34A, 34B at the bottom ends thereof and spans fully from the bottom end of the sloped rear wall 38 to the upright front wall 36. The bottom section 40 of the holding container is thus longitudinally shorter and laterally narrower than the open top end of the tapered holding container 24. Grain collected in the tapered upper section of the holding container 24 is thus gravitationally urged downwardly and inwardly toward the narrower bottom section 40 of the container by the sloped walls 38, 34A, 34B of the tapered upper section. The shaft 22A of the longitudinal auger is rotatably supported in the longitudinal mid-plane PM of the cart, and spans the full length of the bottom section 40 of the container 24 from an upright rear end wall 42 thereof that extends vertically downward from the bottom end of sloped rear wall 38 of the container's tapered upper section, to the upright front wall 36 of the container 24.

The auger cover 26 is mounted in a fixed position of slightly elevated relation over the flighting 22B of the longitudinal auger 22, and spans the full or substantially full length of the longitudinal auger 22 from a point at or adjacent the upright rear end wall 42 of the container's bottom section 40 to a point at or adjacent the upright front wall 36 of the container 24. In the instance of a retrofit installation, where the fan 12 is added to an existing grain cart without replacement of the original auger cover, the auger cover 26 may be of the type illustrated in FIGS. 4 and 5, where it is formed of solid (i.e. non-perforated) metal sheeting or metal plating bent into a pitched roof shape having a central peak that lies in the midplane PM of the cart in aligned relation over the auger shaft 22A, and from which two symmetric halves of the auger cover 26 slope obliquely downward and outward at an obtuse angle to one another toward the respective side walls of the container's lower section. As shown in FIGS. 4 and 5, where the shaded area denotes grain contents of the holding container 24, the auger cover 26 shields the longitudinal auger 22 from direct overhead exposure to the grain contents to prevent the substantial weight of a full grain load from acting directly on the auger from above.

Instead, the grain content enters the inter-flight spaces of the longitudinal auger 22 in lateral fashion via clearance spaces situated between the auger cover 26 and the walls of the holding container 24 on both sides of the auger 22. The aforementioned empty cavity space beneath the auger cover 26 and above the auger shaft 22A remains unoccupied by the laterally entering grain, thus creating the longitudinal airflow channel 28 that is pressurized by the fan 12 in the grain drying mode of the grain cart 10. With reference to FIG. 4, in which the arrows denote airflow movement in the grain drying mode, the air introduced into the longitudinal airflow channel 28 exits this channel through the open bottom of the auger cover 26, thus permeating into the accumulated grain and migrating upwardly therethrough to escape to atmospheric through the open top end 24A of the holding container 24. So long as the fan 12 is running, this upward airflow continues, thus drying out the grain contents of the holding container 24. Optionally, the standard solid auger cover 26 may be replaced with a perforated auger cover 26 allowing air to permeate into the grain through any perforated areas (top, sides, or both) of the auger cover, rather than only through the open bottom of the cover. In such instances, the perforations in the auger cover should be small enough to prevent the grain contents from falling therethrough and defeating the auger-protection purpose of the original auger cover 26. The perforations would thus preferably be smaller than the individual grain size of crop types for which the cart's use is anticipated.

Figure 3:
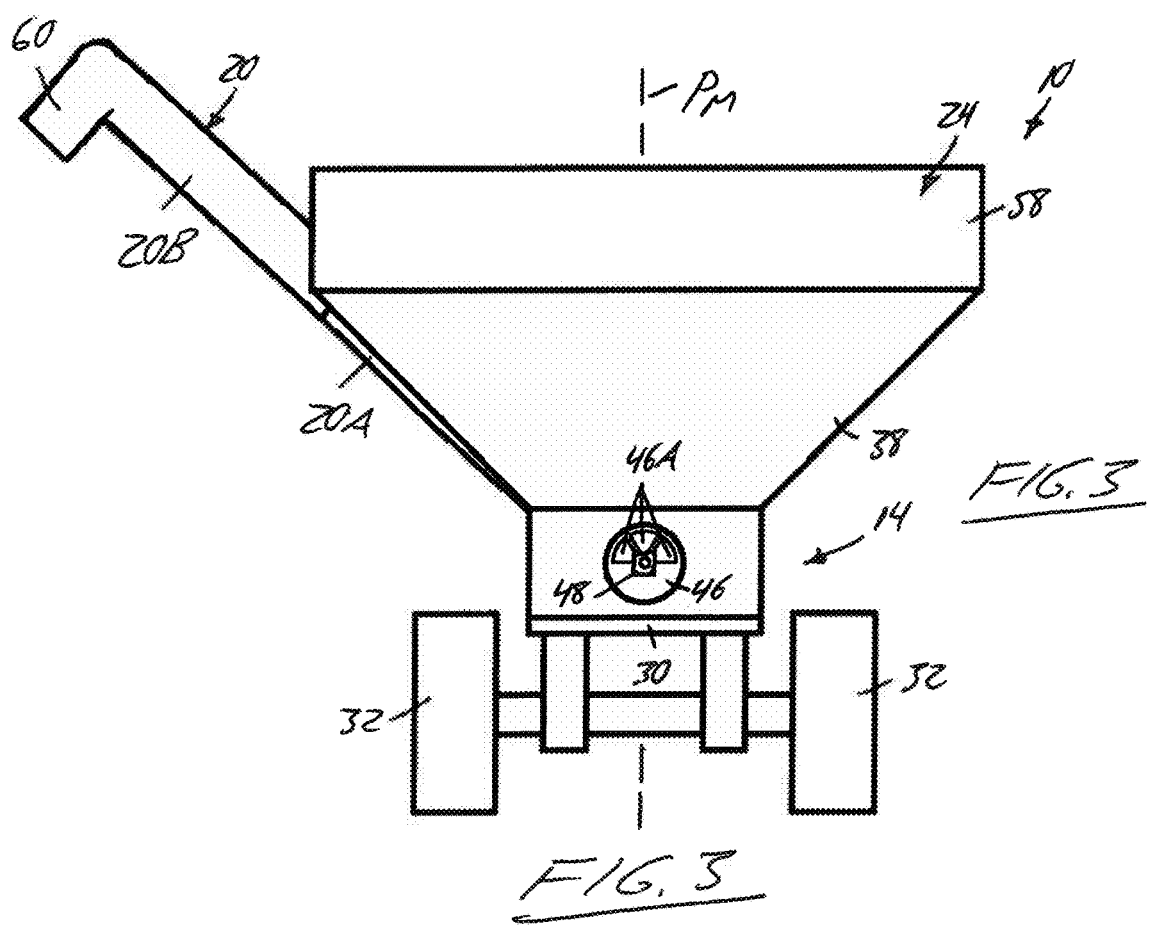
FIG. 3 is a rear elevational view of the dual-purpose grain cart of FIG. 1, but with a grain drying fan and an associated plenum thereof removed to show a modified bearing support plate used in retrofit of an existing single-purpose grain cart to add the grain drying functionality thereto.

With reference to FIGS. 1 to 3, attention is now turned to one non-limiting option for mounting of the fan 12 to the grain cart 10. Referring first to FIG. 3, a round bearing support plate 46 is bolted to the upright rear end wall 42 of the holding container's bottom section 40 to removably carry thereon a respective bearing 48 that rotatably supports the rear end of the longitudinal auger shaft 22A. In its original unmodified state on an existing grain cart, this bearing support plate 46 is a solid metal plate, to which the bearing 48 is mounted. By supporting the bearing 48 on a bolted or otherwise removable support plate 46, the support plate 46 and attached bearing 48 can be removed to enable access to the bearing 48 and longitudinal auger 22 for service, cleanout and repair. In the present embodiment, based on retrofit of an existing grain cart, the bearing support plate 46 is modified from its original factory form by machining a plurality of airflow openings 46A therein, preferably in a top half of the bearing support plate 46 since this will best align with the longitudinal airflow channel 28 at the top of the longitudinal auger 22. These airflow openings 46A thus serve as an inlet of the longitudinal airflow channel through which fan-fed airflow is introduced thereto.

Referring to FIG. 1, a plenum 50 has a proximal end thereof attached to the modified bearing support plate 46, from which the plenum cantilevers rearwardly outward from the upright rear end wall 42 of the holding container's lower section in a position residing below the sloped rear wall 38 of the holding container's tapered upper section. A bottom wall 50A of the plenum may be a relatively thick and rigid metal plate welded to the bearing support plate 46, and atop which at least a portion of the fan 12 may be seated. An upper shroud of the plenum that cooperates with the bottom plate 50A to close around the output of the fan 12 may be formed of lower gauge sheet metal or other material of lesser rigidity than the bottom plate 50A, since no part of the fan's weight will be borne by this upper shroud of the plenum 50. The plenum thus forms an enclosed space through which airflow from the output of the fan 12 is directed into the longitudinal channel 28 of the holding container 24 via the airflow openings 46A in the modified bearing support plate 46. In the illustrated embodiment, the plenum 50 is used to create an axial space between the longitudinal airflow channel 28 and the output of the fan 12, because the height of the illustrated fan 12 prohibits a more direct mounting of the fan to the bearing support plate 46 or upright rear end wall 42 of the holding container's lower section due to vertical space constraints where the rear walls 38, 42 of the holding container's upper and lower sections 24 meet at the rear end 14 of the cart 10.

To reduce how much, if any, of the fan's weight is actually borne by the bottom plate 50A of the plenum, the fan 12 in the illustrated embodiment is also supported in suspended fashion from the rear end of the holding container 24. With reference to FIG. 2, the non-limiting example shown in the drawings employs a mounting bracket 52 attached to the fan housing, for example on the same side thereof as an electric motor 54 of the fan 12, and a pair of turnbuckles 56 having lower ends thereof connected to the mounting bracket 52 and diverging upwardly and laterally away from one another for separate attachment of their upper ends to an upper region of the holding container's rear end. In the illustrated example, the upper ends of the two turnbuckles 56 are fastened to an upper rear wall 58 of the holding container that stands vertically upright from the top end of the sloped rear wall 38 at a location directly overhead of the fan. However, depending on the particular position of the fan relative to the rear walls of the container 24, the turnbuckle's may alternatively be connected to the rear end of the container at a location on the sloped rear wall 38 thereof.

Also, it will be appreciated that while use of turnbuckles 56 as hanging supports for the fan enables length adjustment of these supports, hanging supports of fixed length may alternatively be used. While turnbuckle's combine such length adjustability with the ability to take both tensile and compressive loads, straps or other flexible supports capable of only tensile loads may alternatively be employed for hanging support of the fan, though this may be less preferable from the viewpoint of maintaining a stable position of the fan without undue strain on the base plate 50A of the plenum as the cart is transported over rough terrain. Optionally, the fan 12 may be removed from the grain cart 10 altogether when not being used for grain drying purposes. The plenum 50, if included, may optionally be left in place even when the grain cart is used in field harvesting mode, in which case the plenum may be plugged, capped or otherwise closed off to prevent any grain loss therethrough during such field use.

FIG. 1A shows the dual-purpose grain cart 10 being used in a conventional harvesting mode, where the grain cart 10 is towed in a field by a tractor alongside a combine harvester that discharges the harvested, threshed and winnowed grain into the holding container 24 through the open top end 24A thereof. Once filled, the grain cart is towed from the field to a nearby parked road transport vehicle, typically a semi-trailer with one or more hopper bottom trailers, into which the collected grain from the holding container 24 is transferred using the discharge auger 20.

In the illustrated embodiment, the discharge auger 20 of the grain cart 10 is a folding auger composed of a lower first section, and an upper second section. Each section features a respective auger tube 20A, 20B and a respective auger rotatably disposed therein. The auger tube 20A of the lower first section (the "first auger tube") has an inlet situated at the front end of the holding container 24 in communication with an outlet of the longitudinal auger 22 at the upright front wall 36 of the holding container 24. Operation of the longitudinal auger 22 thus feeds the grain contents of the holding container 24 into the first auger tube 20A of the folding discharge auger 20. The first auger tube 20A of the folding discharge auger 20 resides at an upwardly inclined angle sloping laterally outward from where the discharge auger 20 and longitudinal auger 22 communicate with one another at the longitudinal midplane PM of the cart 10. The first auger tube 20A terminates at or near the laterally outermost extent of the respective angled side wall 34A of the holding container, and thus has zero or minimal protrusion beyond this side of the holding container 24.

The auger tube 20B of the upper section (the "second auger tube") is pivotally coupled to the first auger tube 20A by a hinge joint 20C situated adjacent an upper end of the first auger tube 20A. The pivotable second auger tube 20B is movable between a working position situated in-line with the first auger tube 20A at an upper output end thereof, as shown in FIGS. 1A and 3; and a stowed position extending laterally inward from the hinge joint 20C toward and through the midplane PM of the cart 10 so as to lie cross-wise of the holding container 24 just outside the front wall 36 thereof. In the working position, the second auger tube 20B forms a parallel, in-line extension of the first auger tube 20A and therefore extends further upwardly and outwardly from the grain cart 10 at the respective side thereof to an elevation high enough to feed into the trailer of a semi-trailer when the grain cart 10 is parked next thereto. For this purpose of offloading grain from the holding container 24 into a semi-trailer (or other road transport vehicle or receptacle), the second auger tube 20B features a discharge spout 60 at a distal end thereof furthest from the hinged joint 20C. The spout 60 is positioned to discharge laterally outward and downward from the second auger tube 20B in the working position thereof.

To block airflow through the discharge auger 20 in the grain drying mode, a discharge cover 62 is included for selective placement thereof over the open output end of the first auger tube 20A of the discharge auger when the second auger tube 20B thereof is folded into the stowed position. The installed discharge cover 62 thus blocks the fan-fed air in the longitudinal airflow channel 28 from escaping the grain cart 10 to the ambient environment through the discharge auger 20. As a result, the only path of escape for the fan-fed air to the ambient environment is through the open top 24A of the holding container, whereby the air will inherently flow upwardly through the grain contents of the holding container 24, thus serving to dry the grain.

The discharge cover 62 is shown in isolation in FIGS. 6 and 7, and features a cover member 64 in the form of a round disc of solid air-impermeable material (wood, plastic, metal, etc.). The cover member 64 has a central hole 66 therein for receiving a conical tip 68 of a shaft-coupler located on a shaft of the respective auger inside the first auger tube 20A (the "first auger"). As is known in the art, this shaft-coupler is used for the purpose of connecting the first auger in the first auger tube 20A to the second auger 70 in the second auger tube 20B when the second auger tube 20B is pivoted into the working position about the hinge joint 20C. When the second auger tube 20B is in the stowed position revealing the open output end of the first auger tube 20A, this conical tip 68 protrudes slightly beyond this open output end of the first auger tube 20A.

The disc-shaped cover member 64 is placed over the open output end of the first auger tube 20A, during which the central hole 66 in the cover member 64 slips over the conical tip 68 of the auger shaft coupler, which thereby serves to properly center the cover member 64 in aligned relation atop the open output end of the first auger tube 20A. In the installed position of the discharge cover 62 shown in FIG. 1B and FIG. 8, the conical tip 68 of the auger shaft coupler can thus be seen protruding upwardly through the central hole 66 in the cover member 64. Meanwhile, the cover member 64 spans the full annular gap between the conical tip 68 of the shaft coupler and the circular rim of the open output end of the first auger tube 20A, thereby blocking any airflow therethrough. The underside of the cover member 62 may be equipped with a resiliently compressible gasket material, at least at areas adjacent the inner and outer perimeters of the cover member 62, in order to ensure a full air-tight seal with both the conical tip 68 and the first auger tube 20A.

To enable convenient manual placement of the cover member 64 in its installed position from ground level, a handle assembly 72 is attached to the cover member 64, and extends downwardly away therefrom one side thereof at an oblique angle to a plane of the cover member 64. In the illustrated embodiment, the handle assembly comprises two elongated bars 74A, 74B for respective gripping in the two hands of a user. These elongated bars 74A, 74B lie at said oblique angle to the plane of the cover member 64, reside in horizontally spaced relation to one another, and are perpendicularly interconnected by one or more cross-bars 76A, 76B that maintain the spaced relationship between the two elongated bars 74A, 74B. The illustrated example features a bottom cross-bar 76A situated furthest from the cover member 64 at or adjacent a lower end of the handle assembly 72, and an intermediate cross-bar 76B situated roughly half way between the lower end of the handle assembly 72 and the top end thereof that is connected to the cover member 64.

The discharge cover 62 of the illustrated embodiment also includes a hooking component 78 attached to the cover member 64 on a side thereof opposite that on which the handle assembly 72 resides. The hooking component features a pair of hooks 80 horizontally spaced apart by a distance exceeding the axial length of a central hinge knuckle 84 of the hinged joint 20C between the two auger tubes 20A, 20B of the discharge auger 20. This central knuckle 84 of the hinged joint is attached to the second auger tube 20B, and the two hooks 80 are appropriate sized and positioned to respectively hook around the underside of two outer knuckles of the hinge joint 20C, which are instead attached to the first auger tube 20A and are situated on opposite sides of the central knuckle 84. To enable this, the distance $D_1$ from a center axis of the cover member 64 on which the hole 66 is centered, to a hook axis that is perpendicular to the center axis and denotes the radial center of the two hooks 80, is equal to the radial distance $D_2$ from the pivot axis of the hinge joint 20C to the central axis of the first auger tube 20A. As shown in FIG. 8, in its installed position atop the first auger tube 20A, the discharge cover 62 thus has its two hooks 80 engaged about the hinge joint 20C to prevent the discharge cover 62 from sliding off the open output end of the first auger tube 20A. Meanwhile, the handle assembly 72 hangs downwardly from the output end of the first auger tube 20A in a generally vertical orientation down toward the ground.

In the illustrated embodiment, two connecting bars 86 span across the topside of the cover member 64 and are affixed thereto, for example by bolts (hot shown). Each connecting bar 86 respectively connects one of the elongated handle bars 74A, 74B to one of the hooks 80, whereby the handle assembly 72 and the hooking component 78 are interconnected parts of shared framework by which the discharge cover is manipulatable by a user and engageable to the grain cart 10. It will be appreciated however that this need not be the case, and the handle assembly 72 and hooking component 78 may be separately attached to the cover member 64. As shown, the connecting bars 86 may be interconnected by one or more additional cross-bars 88A, 88B to maintain the rigidity of the shared framework, and thereby help maintain the appropriately spacing between the hooks 80 for proper alignment with the outer knuckles of the hinge joint 20C.

As shown in FIG. 8, to prevent pivotal movement of the discharge cover 62 upwardly about the pivot axis of the hinge joint 20C, which would break the seal between the cover member 64 and the first auger tube 20A, a securement member 90, for example a flexible tarp strap or bungie cable, may be hooked between the handle assembly 72 and an appropriate anchoring point 92 on the first auger tube 20A, or a nearby anchoring point on the frame 30 of the grain cart 10 or front wall 36 of the holding container 24. In the illustrated example, one or more tarp straps or bungie cords 90 each have one end hooked to the bottom cross-bar 76A of the handle assembly 72, and the other end hooked to a bar, lug or other hook-compatible anchor point 92 on the handle-facing side of the first auger tube 20A. The cover member 64, or any other component of the overall discharge cover 62, may be provided with a bright and/or reflective paint, coating, tape, flag or other visual indicator that is of contrasting visual appearance to the discharge auger 20, and preferably also to the holding container 24. This helps draw visual recognition to the installed discharge cover 62 to minimize the likelihood of an operator inadvertently actuating movement of the second auger tube 20B into the working position without having first removed the discharge cover from the first auger tube 20A.

So in the illustrated example, installation of the discharge cover 62 in setting up of the grain cart for a grain drying operation involves moving the second auger tube 20B of the discharge conveyor 20 into the stowed position if not already therein, lifting of the cover member 64 up into elevated relation over the open output end of the first auger tube 20A from ground level using the handle assembly 72, engaging the hooks 80 about the outer knuckles of the hinge joint 20C, lowering or dropping the cover member 64 onto the open output end of the first auger tube 20A in pivotal fashion about the pivot axis of the hinge joint 20C, and anchoring the discharge cover 62 in place with a tarp strap, bungie cord or other securement member 90. Returning the grain cart 10 to a field-ready state for a harvesting operation involves removal of the discharge cover 62 and movement of the second auger tube 20B into the working position, by reverse performance of the forgoing setup steps for the drying operation.

The dual purpose grain cart 10 can thus be used in a conventional manner in harvesting mode, but then subsequently used in a novel grain drying mode either once harvest has been fully completed for the season, or during any delay period between sequential harvesting operations, for example due to weather delays, harvester breakdown, labour shortage, or any other cause of delay. A farmer can thus achieve notable cost savings by employing the novel grain cart for both harvesting and grain drying, thus avoiding the expense of acquiring and setting up a dedicated grain dryer. Also, since the towable grain cart is portable, it can be transported from one grain storage site to another, for example for shared use among multiple grain storage sites or farms.

Optionally, the output of a portable construction heater may be connected to an air intake of the fan 12 to supply pre-heated air thereto, for example via flexible ducting, in order to improve the grain drying performance of the grain cart 10. Where such auxiliary heat is applied to the grain cart's supply of forced air, preferably one or more temperature sensors are included to ensure safe heating levels are not exceeded. In one implementation, temperature and humidity sensors may be installed in any one or more of three different locations: (1) in a location obtaining an outside air reading of the ambient environment surrounding the cart 10; (2) inside the plenum 50 to monitor the air temperature of the fan output downstream of the inputted auxiliary heat to make ensure the fan output doesn't exceed safe temperature levels for grain drying; and (3) above the cart to get a reading of the air after it has moved through the grain and is being exhausted to the ambient environment. Sensor output from test trials may be used to develop crop specific charts for proper drying times. As it is known to include load cells in a grain cart for measuring the weight of its grain contents, measurements from such load cells before and after drying can be used to assess the amount of moisture removed during the drying operation.

In the embodiment of FIGS. 1 to 4, the existing cavity space between the longitudinal auger and the overlying auger cover 26 is employed as a central airflow channel through the fan output is directed to the grain contents of the holding container 24 from a location at or closely adjacent the bottom of the holding container 24. FIG. 5 shows an alternate embodiment, which additionally or alternatively includes laterally situated airflow channels 128A, 128B running downwardly along the sloped side walls 34A 34B of the holding container 24. These lateral airflow channels 128A, 128B terminate at outlets of equal, similar or lesser elevation than that the auger cover 26. Fan-fed airflow introduced to these lateral airflow channels 128A, 128B thus permeates into the grain in the holding container 24 at an elevation at or near the bottom of the holding container 24, just like in the earlier embodiment using the central longitudinal airflow channel 28. Blocking off of the discharge conveyor 20, whether with the illustrated discharge cover or an alternate cover design, is once again used to prevent air loss through the discharge conveyor 20. Accordingly, the forced air introduced via the lateral airflow channels 128A, 128B will once again flow upwardly through the accumulated grain in order to escape to atmosphere via the open top 24A of the holding container 24, thus providing the same grain-drying function as the center airflow configuration of the earlier embodiment. Each sloped side wall 34A, 34B of the holding container 24 may feature a singular lateral airflow channel 128A, 128B of notable width spanning an entirety or substantial entirety of the respective side wall 34A, 34B in the longitudinal direction of the grain cart 10, or a series of separate lateral airflow channels situated side-by-side in closely spaced distribution over the longitudinal dimension of the holding container 24. Either way, the result is introduction of forced air into the interior of the holding container over an entirety or substantial majority of its longitudinal measure to ensure aeration of the full volume of grain in relatively uniform fashion.

It will be appreciated that whether a central longitudinal airflow channel 28, lateral airflow channels 128A, 128B, or a combination thereof are used to introduce the supply of drying air to the grain contents of the holding container 24, the location at which the fan 12 is mounted to the grain cart may be varied from that shown in FIGS. 1 and 2, with suitable ducting, hosing or the like being used to route the air from the fan to an inlet of each airflow channel. Also, when multiple airflow channels are employed, multiple fans may be employed to provide forced air thereto, whether on a 1:1 ratio with a dedicated fan per airflow channel, or at some other ratio involving sharing of a fan between multiple airflow channels.

Additionally, while the illustrated embodiment is of a significantly large scale grain cart of a type having a longitudinal conveyor running along the bottom of the holding container to feed as separate discharge conveyor situated at a respective end of the holding container, similar incorporation of one or more fans and one or more airflow channels into other known types of grain carts employing an alternate auger layout likewise falls within the scope of the present invention.

For example, smaller scale grain carts sometimes omit a longitudinal auger running generally horizontally to a separate upright discharge auger, and instead employ a singular discharge auger whose first auger section has a lower end centered in the bottom of the holding container from this first auger section angles upwardly and outwardly, and connects with a second auger section outside the holding container at an external hinge joint by which an auger tube of this second auger section is pivotable between working and stowed positions. In such carts, airflow channels built into the side walls (and/or into the front and rear walls) of the holding container may be used to introduce the drying air, with airflow through the discharge auger once again being blocked. This may once again be achieved by placement of a cover at the hinged joint of the folding discharge auger at a location outside the holding container 24, though alternatively, a hydraulically movable gate usually found in the bottom of the holding container to control the rate of admission of the grain contents to the discharge auger may instead provide a sufficiently airtight closure when fully closed, or be modified to achieve such airtight closure, to avoid the need to instead install a separate discharge cover at the hinge joint of the discharge auger outside the holding container.

Finally, while the forgoing embodiments make specific reference to grain carts and the drying of grain, and specific reference to augers as the type of conveyors used to unload the grain contents of the cart, it will appreciated that the same or similar cart design can be employed for drying of other types of particulate material used or produced in agricultural applications, and that substitution of a belt or other conveyor type for the auger-type conveyors of the illustrated also doesn't depart from the scope of the present invention.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A dual-purpose agricultural cart for transporting and conditioning particulate material, said cart comprising:
    a frame supported in elevated relation over an underlying ground surface in a manner conveyable therealong;
    a holding container carried on said frame for receiving and holding said particulate material, said holding container has opposing ends spaced apart in a longitudinal direction;
    a fan carried on the frame; and
    one or more airflow channels each comprising an inlet fed by the fan and at least one outlet positioned to open into the holding container at an elevation at or proximate a lower end thereof to enable aeration of the particulate material via upward fan-driven airflow from the at least one outlet of the one or more airflow channels;
    a longitudinal conveyor carried on said frame and installed in cooperating relation to said holding container at or adjacent the lower end thereof to enable gravitationally influenced loading of accumulated particulate material from the holding container into the conveyor, said longitudinal conveyor running longitudinally of the container and being operable to convey said particulate material toward one of said opposing ends of the holding container; and
    an elongated protective conveyor cover that is mounted in overlying relation to the conveyor;
    wherein said one or more airflow channels comprise a central longitudinal channel running longitudinally of the holding container overtop of said conveyor and beneath said protective conveyor, said conveyor comprises an auger, and the inlet of said central longitudinal channel comprises one or more intake openings situated in a bearing support plate on which a shaft of said auger is rotatably supported.

2. The dual-purpose agricultural cart of claim 1 wherein the fan is connected to the central longitudinal channel by a plenum residing externally of the container.

3. The dual-purpose agricultural cart of claim 1 wherein the fan is connected to the container at a respective end thereof that comprises a sloped end wall, below which the fan is connected to the container.

4. A method of using the dual-purpose agricultural cart of claim 1 to aerate a volume of particulate material, said method comprising, with said volume of particulate material held in the container, running the fan and thereby forcing airflow through the one or more airflow channels and into the volume of particulate material to generate upward airflow through the volume of particulate material from the at least one outlet of the one or more airflow channels.

5. The method of claim 4 comprising exhausting the airflow from the accumulated particulate material via an open top of the container.

6. The method of claim 4 wherein the particulate material comprises harvested grain, and prior to aerating of the volume of particulate material, the same dual-purpose agricultural cart was used in harvest of said harvested grain.

7. The dual-purpose agricultural cart of claim 1 further comprising:
    a discharge conveyor for discharge of the particulate material from the dual-purpose agricultural cart; and
    a discharge closure selectively positionable in an operating position closing off the discharge conveyor during operation of the fan to block air loss through the discharge conveyor.

8. A dual-purpose agricultural cart for transporting and conditioning particulate material, said cart comprising:
    a frame supported in elevated relation over an underlying ground surface in a manner conveyable therealong;
    a holding container carried on said frame for receiving and holding said particulate material;
    a fan carried on the frame;
    one or more airflow channels each comprising an inlet fed by the fan and at least one outlet positioned to open into the holding container at an elevation at or proximate a lower end thereof to enable aeration of the particulate material via upward fan-driven airflow from the at least one outlet of the one or more airflow channels;
    a discharge conveyor for discharge of the particulate material from the dual-purpose agricultural cart; and
    a discharge closure selectively positionable in an operating position closing off the discharge conveyor during operation of the fan to block air loss through the discharge conveyor.

9. The dual-purpose agricultural cart of claim 8 wherein the discharge conveyor is a folding conveyor, and the discharge closure is a removable cover configured for selective placement in the operating position at a folding point of said discharge conveyor.

10. The dual-purpose agricultural cart of claim 9 wherein the removable cover comprises a hook component configured for hooked engagement about a hinge joint at the folding point of said discharge conveyor.

11. The dual-purpose agricultural cart of claim 8 wherein the discharge closure is a removable cover that comprises an elongated handle for enabling manual placement of the removable cover in the operating position.

12. The dual-purpose agricultural cart of claim 8 wherein the fan and an inlet of the discharge conveyor reside respectively adjacent opposing ends of the container.

13. A dual-purpose agricultural cart for transporting and conditioning particulate material, said cart comprising:

a frame supported in elevated relation over an underlying ground surface in a manner conveyable therealong;

a holding container carried on said frame for receiving and holding said particulate material;

a fan carried on the frame;

one or more airflow channels each comprising an inlet fed by the fan and at least one outlet positioned to open into the holding container at an elevation at or proximate a lower end thereof to enable aeration of the particulate material via upward fan-driven airflow from the at least one outlet of the one or more airflow channels;

wherein the fan is connected to the container at a respective end thereof that comprises a sloped end wall beneath which the fan resides, and the fan is at least partially supported in suspended fashion from an upper region of the respective end of the container situated above the sloped end wall thereof.

14. A method of using the dual-purpose agricultural cart of claim 13 to aerate a volume of particulate material, said method comprising, with said volume of particulate material held in the container, running the fan and thereby forcing airflow through the one or more airflow channels and into the volume of particulate material to generate upward airflow through the volume of particulate material from the at least one outlet of the one or more airflow channels.

15. A dual-purpose agricultural cart for transporting and conditioning particulate material, said cart comprising:

a frame supported in elevated relation over an underlying ground surface in a manner conveyable therealong;

a holding container carried on said frame for receiving and holding said particulate material;

a fan carried on the frame; and one or more airflow channels each comprising an inlet fed by the fan and at least one outlet positioned to open into the holding container at an elevation at or proximate a lower end thereof to enable aeration of the particulate material via upward fan-driven airflow from the at least one outlet of the one or more airflow channels;

wherein said one or more airflow channels comprise wall mounted airflow channels built into one or more walls of the holding container.

16. The dual-purpose agricultural cart of claim 15 wherein said wall mounted airflow channels run downwardly along said one or more walls of the holding container.

17. The dual-purpose agricultural cart of claim 15 wherein said wall mounted airflow channels run along said one or more walls on interior sides thereof.

18. The dual-purpose agricultural cart of claim 15 wherein said wall mounted airflow channels slope obliquely downward toward the bottom end of the holding container.

19. The dual-purpose agricultural cart of claim 15 wherein said one or more walls of the holding container comprise sloped walls angling obliquely downward toward the bottom end of the holding container.

20. The dual-purpose agricultural cart of claim 15 wherein said one or more wall-mounted airflow channels comprise a pair of wall-mounted airflow channels residing on respective side walls of the holding container at opposing sides thereof, and each spanning a substantial entirety of the respective side wall in a longitudinal dimension of the holding container.

21. The dual-purpose agricultural cart of claim 15 wherein said one or more wall-mounted airflow channels comprise two sets of wall-mounted airflow channels residing on respective side walls of the holding container at opposing sides thereof, each set occupying an entirety or substantial majority of the respective side wall in a longitudinal dimension of the holding container.

22. A method of aerating a volume of particulate material, said method comprising:

having a dual-purpose agricultural cart comprising:

a frame supported in elevated relation over an underlying ground surface in a manner conveyable therealong;

a holding container carried on said frame for receiving and holding said particulate material;

a fan carried on the frame; and one or more airflow channels each comprising an inlet fed by the fan and at least one outlet positioned to open into the holding container at an elevation at or proximate a lower end thereof to enable aeration of the particulate material via upward fan-driven airflow from the at least one outlet of the one or more airflow channels; and a discharge conveyor for discharge of the particulate material from the dual-purpose agricultural cart; and blocking off a tube of the discharge conveyor and, while holding said volume of particulate material in the container and maintaining said tube in a blocked-off state preventing or limiting airflow therethrough, running the fan and thereby forcing airflow through the one or more airflow channels and into the volume of particulate material to generate upward airflow through the volume of particulate material from the at least one outlet of the one or more airflow channels.

23. The method of claim 22 wherein said discharge conveyor is a folding conveyor, and the tube of the discharge conveyor is blocked off at an open end of said tube at a folding point of said folding conveyor.

24. The method of claim 23 comprising blocking of said tube using a discharge cover that is at least partially held in place over said open end of said tube via hooked engagement with a hinge joint of said folding conveyor.

25. A method of using the dual-purpose agricultural cart of claim 15 to aerate a volume of particulate material, said method comprising, with said volume of particulate material held in the container, running the fan and thereby forcing airflow through the one or more airflow channels and into the volume of particulate material to generate upward airflow through the volume of particulate material from the at least one outlet of the one or more airflow channels.

* * * * *